US008264910B2

(12) United States Patent
Fuisz et al.

(10) Patent No.: US 8,264,910 B2
(45) Date of Patent: Sep. 11, 2012

(54) CIPHER WATCH

(76) Inventors: Richard C. Fuisz, Beverly Hills, CA (US); Joseph M. Fuisz, Surfside, FL (US); Justin Richard Fuisz, Beverly Hills, CA (US); Jessica Saint James Fuisz, Los Angeles, CA (US)

(*) Notice: Subject to any disclaimer, the term of this patent is extended or adjusted under 35 U.S.C. 154(b) by 0 days.

(21) Appl. No.: 12/966,079

(22) Filed: Dec. 13, 2010

(65) Prior Publication Data

US 2012/0147710 A1 Jun. 14, 2012

(51) Int. Cl.

*G04B 47/00* (2006.01)
*G04B 19/04* (2006.01)
*G04B 19/20* (2006.01)
*G09F 9/00* (2006.01)
*G09C 1/06* (2006.01)

(52) U.S. Cl. .............. 368/10; 368/77; 368/80; 368/228; 116/308; 380/57

(58) Field of Classification Search .................... 368/21, 368/27, 76, 77, 223, 228, 233, 10, 80; 116/308; 235/78 R, 88 R; 33/269; 380/57
See application file for complete search history.

(56) References Cited

U.S. PATENT DOCUMENTS

| | | | | |
|---|---|---|---|---|
| 407,425 | A * | 7/1889 | Von Simon | 380/57 |
| 1,564,268 | A * | 12/1925 | Pessoa | 380/57 |
| 3,318,085 | A * | 5/1967 | Lee | 368/27 |
| 3,431,722 | A * | 3/1969 | Haas | 235/61 R |
| 3,452,540 | A * | 7/1969 | Backo | 368/77 |
| 3,686,884 | A * | 8/1972 | Hurt | 368/233 |
| 4,717,260 | A * | 1/1988 | Tsuji | 368/21 |
| 4,945,521 | A * | 7/1990 | Klaus | 368/21 |
| 5,173,566 | A * | 12/1992 | Hiraoka | 84/474 |
| 5,982,710 | A * | 11/1999 | Rawat et al. | 368/21 |
| 6,243,324 | B1 * | 6/2001 | Teng | 368/21 |
| 7,433,270 | B2 * | 10/2008 | Chen | 368/21 |
| 7,859,947 | B2 * | 12/2010 | Kawai | 368/10 |
| 2005/0105397 | A1 * | 5/2005 | Tuason | 368/21 |
| 2006/0171256 | A1 * | 8/2006 | Herbert | 368/21 |

OTHER PUBLICATIONS http://jproc.ca/crypto/crypto_watch.html; "Urkryptografen", Jul. 2003.*
International Search Report and Written Opinion, PCT/US2011/062363, Feb. 10, 2012.

* cited by examiner

*Primary Examiner* — Vit W Miska
(74) *Attorney, Agent, or Firm* — Antonelli, Terry, Stout & Kraus, LLP.

(57) ABSTRACT

A watch able to be used as a cryptographic system to encrypt plaintext to ciphertext or decrypt ciphertext to plaintext includes a watch face and a plurality of concentric rings. Each of the plurality of concentric rings is rotatable with respect to the watch face and includes a number of symbols, the number of symbols corresponding to the number of hours represented on the watch face, at least some of the symbols corresponding to letters of an alphabet, characters in a writing system and/or numbers. At least one of the plurality of concentric rings is rotatable in a direction opposite to a direction of at least one other of the plurality of concentric rings.

12 Claims, 1 Drawing Sheet

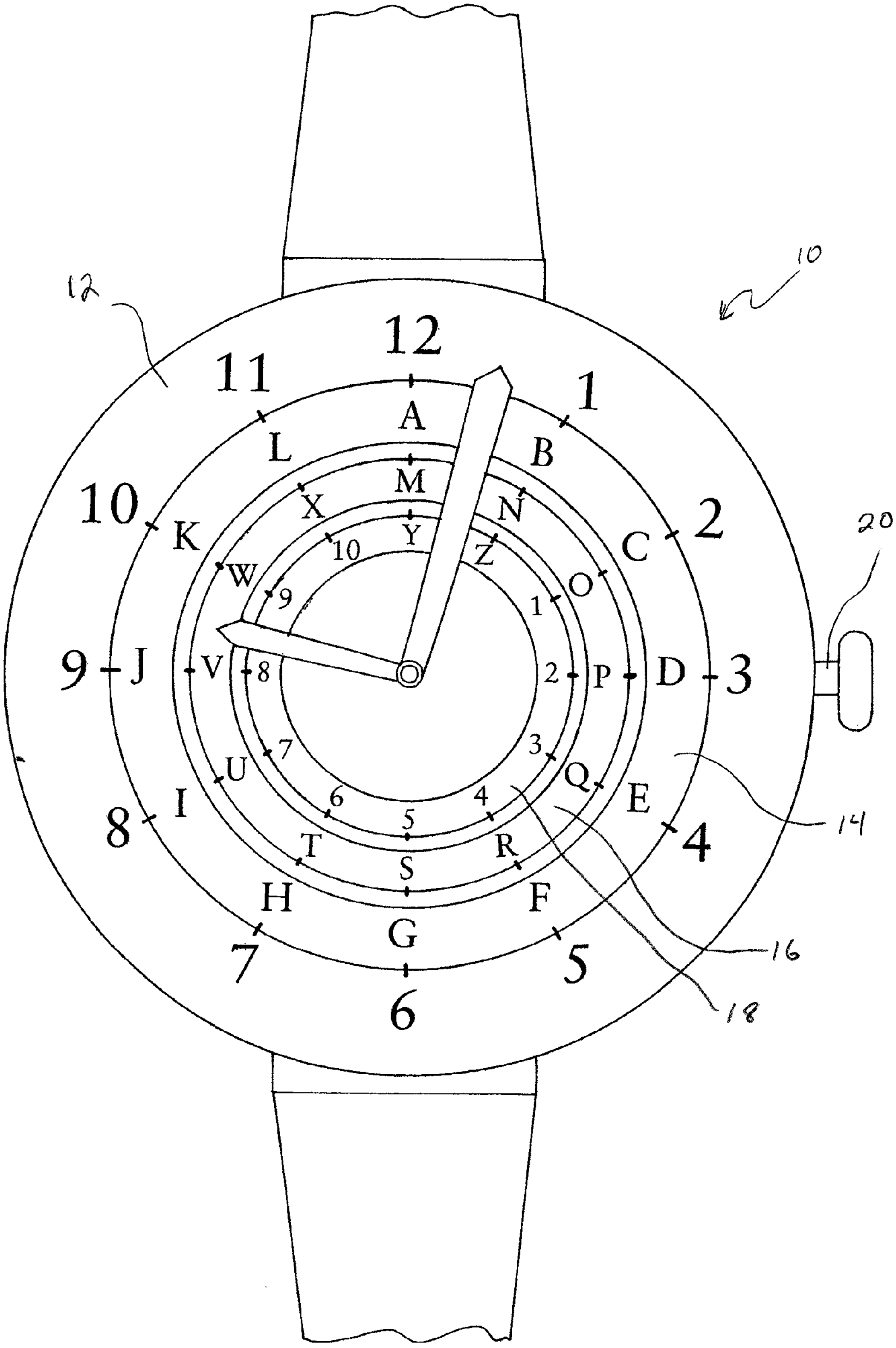
10
12
14
16
18
20
12 1 2 3 4 5 6 7 8 9 10 11
A B C D E F G H I J K L
M N O P Q R S T U V W X
Y Z 1 2 3 4 5 6 7 8 9 10

CIPHER WATCH

SUMMARY

A watch able to be used as a cryptographic system to encrypt plaintext to ciphertext or decrypt ciphertext to plaintext includes a watch face and a plurality of concentric rings. Each of the plurality of concentric rings is rotatable with respect to the watch face and includes a number of symbols, the number of symbols corresponding to the number of hours represented on the watch face, at least some of the symbols corresponding to letters of an alphabet, characters in a writing system and/or numbers. At least one of the plurality of concentric rings is rotatable in a direction opposite to a direction of at least one other of the plurality of concentric rings.

BRIEF DESCRIPTION OF THE DRAWING

The FIGURE shows, as a non-limiting example, one embodiment of a cipher watch according to the present invention.

DETAILED DESCRIPTION OF THE INVENTION

A watch able to be used as a cryptographic system to encrypt plaintext to ciphertext or decrypt ciphertext to plaintext, referred to herein as a cipher watch, includes a watch face and a plurality of concentric rings. Each of the plurality of concentric rings is rotatable with respect to the watch face and includes a number of symbols, the number of symbols corresponding to the number of hours represented on the watch face, at least some of the symbols corresponding to letters of an alphabet, characters in a writing system and/or numbers. At least one of the plurality of concentric rings is rotatable in a direction opposite to a direction of at least one other of the plurality of concentric rings.

As shown by way of example only in the accompanying FIGURE, watch 10 includes a watch face 12 and at least three concentric rings 14, 16, 18. In the embodiment shown in the FIGURE, the watch face 12 is an analog-style watch face including twelve markers 1-12 displayed around the face corresponding to the hours 1-12. In the FIGURE, the hour hand is shown slightly displaced in order to not obscure the markings on the concentric rings 14, 16, 18. Of course, markers other than the Arabic numerals 1-12, e.g., Roman numerals or unnumbered marks, can be used in place of some or all of the Arabic numerals. Also, it is not absolutely necessary to include any markers for the hours since the position of the hours on a watch face is well-known to users.

Alternatively, more than 12 markers can be used, e.g., 24 markers to correspond to "military time." If military time used as 24 hour face then the capacity for ciphertext and plaintext is potentially doubled from the 12 hour version. If military time used as 24 hour face, only two concentric rings provide space for 48 characters (24 on each ring).

Each of the at least three concentric rings 14, 16, 18 is rotatable with respect to the watch face 12 and includes, in this embodiment, twelve symbols. In an embodiment using a 24 hour watch face (not shown in the drawings), 24 symbols would be provided on each ring. In any case, at least some of the symbols correspond to letters of an alphabet, characters in a writing system and/or numbers. In the embodiment shown in the FIGURE, the symbols are the 26 letters of the Latin alphabet A-Z and ten numbers 1-10. In this embodiment, letters A-L are provided in clockwise order on ring 14, letters M-X are provided in clockwise order on ring 16, and letters Y and Z and numbers 1-10 are provided in clockwise order on the ring 18.

While the embodiment shown in the drawing has the letters and numbers in order, the order can be reversed and/or the letters and numbers can be mixed. Alternatively, the letters and numbers can be totally randomized, which would eliminate predictive value from a casual observer; that is, the 26 letters can be distributed on the at least three concentric rings 14, 16, 18 in an order not corresponding to their order in the Latin alphabet and, likewise, the numbers need not be in numerical order. In the embodiment shown, the symbol "O" can designate either the letter "O" or zero, but the invention also includes having the symbol "0" (zero) on one of the plurality of rings.

It is also possible to provide other symbols or designations for, e.g., a "space" in addition or in place of the letters and numbers shown. Additional letters, numbers, characters, symbols, etc. can be added on additional rings if desired.

While the letters are shown in the FIGURE to be letters of the Latin alphabet, other alphabets may be used in place of or in addition to the Latin alphabet. Additional rings may be needed for Arabic or Hiragana, etc. The rings can be a mix of letters and numbers, some Arabic for example and some Latin letters, for example. As long as users fluent in the languages, mixing alphabets will work and make very difficult for a casual observer to understand the purpose of the cipher watch.

The rings 14, 16, 18 are rotatable with respect to the watch face 12 by any mechanism, which would be known to those skilled in the watch art. While it is possible to have the rings 14, 16, 18 manually rotatable with respect to the watch face 12, e.g., with a mechanism such as that known with respect to a unidirectional bezel of a diving watch, the rings 14, 16, 18 are preferably rotatable automatically with respect to the watch face 12 as will be appreciated from the disclosure that follows. Each of the rings 14, 16, 18 can be rotatable with respect to the watch face 12 in only one direction or in both directions. Thus, in the set up of the watch or device, the concentric rings are settable by the user either individually or together and in any direction. However, at least one of the rings 14, 16, 18 should be rotatable in a direction opposite to a direction of at least one other of the rings 14, 16, 18 as will be appreciated from the disclosure that follows. In any case, the rings are rotatable, i.e., they can be rotated manually or by the watch movement in such a way that at least one ring rotates in a direction opposite at least one other ring at a fixed time(s), e.g., in a 24 hour period.

The rings are settable separately or as a group, with at least one ring going the opposite of at least one other. In an electronic movement or application the same movement can occur in functionality but is programmed in the software. With a mechanical or quartz watch, the rings 14, 16, 18 can be set manually with respect to the watch face 12 and each other, e.g., with a mechanism such as that known with respect to a unidirectional bezel of a diving watch. Preferably, however, especially since the rings are preferably automatically rotated, the rings 14, 16, 18 can be also set with the stem of the watch, e.g., by pulling the stem 20 out to a different position than that used for setting the time, e.g., with the multi-function methodology employed in day and date and moon phase discs. The rings 14, 16, 18 can also be set with a separate stem and crown. With an electronic watch, a computer presentation, a smart phone application, etc., the rings 14, 16, 18 can also be set electronically.

Each of the rings 14, 16, 18 is settable separately and each symbol (in the embodiment shown, each letter and numeral)

lines up with one of the twelve markers 1-12 displayed around the face or at least one of the spaces around the face corresponding to the hours 1-12. To encrypt plaintext to ciphertext, the user locates the desired letter or numeral of the plaintext on one of the rings 14, 16, 18. Using the position of that letter or numeral with respect to one of the hours 1-12 and a designation for the ring on which that letter or numeral appears (e.g., ring 1, 2, or 3 or ring I, II or III or ring A, B or C or some other designation), the user determines the ciphertext corresponding to the desired letter or numeral of the plaintext. For example, if one designates the rings 14, 16, 18 as A, B and C, respectively, the plaintext letter A is at a position corresponding to hour 12 on ring A (ring 14), the plaintext letter B is at a position corresponding to hour 1 on ring A (ring 14) . . . the plaintext letter Z is at a position corresponding to hour 1 on ring C (ring 14), etc. Thus, the user can encrypt the plaintext letter A as 12A (for position corresponding to hour 12 on ring A), the plaintext letter B as 1A . . . the plaintext letter Z as 1C, etc.

Using the example shown in the FIGURE, if one designates the rings 14, 16, 18 as A, B and C, respectively, the plaintext word "H E L L O" would by encrypted using the cipher watch as a cryptographic system to the ciphertext as "7A 4A 11A 11A 2B" and the telephone number "7039361212" as "8C 2B 4C 10C 4C 7C 2C 3C 2C 3C." Using the example shown in the FIGURE, if one designates the rings 14, 16, 18 as 1, 2 and 3, respectively, the plaintext word "H E L L O" would by encrypted using the cipher watch as a cryptographic system to the ciphertext as "71 41 111 111 22." Using the example shown in the FIGURE, if one designates the rings 14, 16, 18 as I, II and III, respectively, the plaintext word "H E L L O" would by encrypted using the cipher watch as a cryptographic system to the ciphertext as "7I 4I 11I 11I 2II." While this example uses as the ciphertext the position of that letter or numeral with respect to one of the hours 1-12 as a first part of the ciphertext and the designation for the ring on which that letter or numeral appears (e.g., ring 1, 2, or 3 or ring I, II or III or ring A, B or C or some other designation) as the second part of the ciphertext, the opposite order could be used, i.e., the designation for the ring on which that letter or numeral appears (e.g., ring 1, 2, or 3 or ring I, II or III or ring A, B or C or some other designation) as a first part of the ciphertext and the position of that letter or numeral with respect to one of the hours 1-12 as the second part of the ciphertext.

In order to change the cipher, at least one of the rings is rotated with respect to at least one other ring and with respect to the watch face. For example, the rings can be advanced once each day, e.g., at midnight or any other time, with one at least one ring preferably being rotated in a direction opposite to at least one other ring, and then the cipher changes. The rotation of one or more rings is not limited to once every 24 hours but can be every one second to every one year. Since the rings are settable, if two or more parties set their respective cipher watches simultaneously in the same position,—then those two or more people can communicate by, but not limited to, written, text, verbal or instant type messages. All three rings are capable of being separately set and all three rings can move in a movement in any direction relative to one another. Provided that the same type of cipher watch is used by multiple parties and synchronized (e.g., by the rings being advanced in the same manner at the same time), the encrypted messages (ciphertext) can be decrypted by another party to plaintext. The jump time for advancing a ring, e.g., by a mechanism as in a date watch, could be GMT midnight or local midnight or any other predetermined time. The rings can be rotated (advanced) manually or automatically, by any mechanism as would be known to those skilled in the art.

The watch screen can have crystal polarization to make side view obscured and or a banding of a type to make casual reading by another difficult. Also light luminescence can be used to make letters and numbers readable in the dark, either through a battery or some such kinetic movement device for current generation or by the luminescence of the symbols themselves.

The cipher watch of the present invention can be embodied in an electronic watch, a mechanical watch, a computer presentation, a smart phone application, or any presentation which allows for the function described above. Thus, a mechanical watch movement, a computer chip movement (digital etc.) or an application for a cell phone, computer or some such type device can be used. It should be noted that there are many possible relationships of the three rings-individually settable with relation to the hour numbers and/or each ring clicking in to its own relationship with or without the other two rings in a locked sequence so that entire alphabet is covered.

What is claimed is:

1. A watch able to be used as a cryptographic system to encrypt plaintext to ciphertext or decrypt ciphertext to plaintext, comprising:

a watch face; and at least three concentric rings, each of the least three concentric rings being rotatable with respect to the watch face and including a number of symbols, the number of symbols corresponding to the number of hours represented on the watch face, at least some of the symbols corresponding to letters of an alphabet, characters in a writing system and/or numbers, at least one of the least three concentric rings being rotatable in a direction opposite to a direction of at least one other of the least three concentric rings, wherein the symbols corresponding to letters of an alphabet, characters in a writing system and/or numbers as a cryptographic system are arranged in a configuration that enables encryption of plaintext to ciphertext or decryption of ciphertext to plaintext.

2. The watch according to claim 1, wherein the watch face is an analog watch face including space around the face for the hours 1-12.

3. The watch presentation according to claim 1, wherein the watch is embodied in a smart phone application or in a computer application.

4. The watch according to claim 1, wherein each of at least three concentric rings includes 12 symbols.

5. The watch according to claim 4, wherein the symbols are distributed on the at least three concentric rings in an order not corresponding to their order in an alphabet and not corresponding to numerical order.

6. The watch according to claim 4, wherein the 26 letters of the Latin alphabet and ten numbers are provided on the at least three concentric rings.

7. The watch according to claim 6, wherein the 26 letters of the Latin alphabet are distributed on the at least three concentric rings in an order not corresponding to their order in the Latin alphabet.

8. The watch according to claim 1, wherein the 26 letters of the Latin alphabet and ten numbers are provided on the at least three concentric rings.

9. The watch according to claim 8, wherein the 26 letters of the Latin alphabet are distributed on the at least three concentric rings in an order not corresponding to their order in the Latin alphabet.

10. The watch according to claim 1, wherein the watch face includes markers around the face corresponding to the hours 1-12.

11. The watch according to claim 1, wherein the watch face is an analog watch face including space around the face for the hours 1-24.

12. A watch able to be used as a cryptographic system to encrypt plaintext to ciphertext or decrypt ciphertext to plaintext, comprising:

a watch face;

a plurality of concentric rings, each of the plurality of concentric rings being rotatable with respect to the watch face and including a number of symbols, the number of symbols corresponding to the number of hours represented on the watch face, at least some of the symbols corresponding to letters of an alphabet, characters in a writing system and/or numbers, at least one of the plurality of concentric rings being rotatable in a direction opposite to a direction of at least one other of the plurality of concentric rings; and a mechanism for rotating at least one of the plurality of concentric rings with respect to the watch face at a predetermined time, wherein the symbols corresponding to letters of an alphabet, characters in a writing system and/or numbers as a cryptographic system are arranged in a configuration that enables encryption of plaintext to ciphertext or decryption of ciphertext to plaintext.

* * * * *